United States Patent [19]

Russell et al.

[11] Patent Number: 4,737,016
[45] Date of Patent: Apr. 12, 1988

[54] PORTABLE FIELD MICROSCOPE

[76] Inventors: Bruce J. Russell; James C. Harvey, both of P.O. Box 457, Loomis, Calif. 95650

[21] Appl. No.: 847,694
[22] Filed: Apr. 3, 1986
[51] Int. Cl.⁴ .................................. G02B 27/02
[52] U.S. Cl. ......................................... 350/239
[58] Field of Search .......................... 350/235–245

[56] References Cited

U.S. PATENT DOCUMENTS

| 1,881,072 | 10/1932 | Fiske | 350/241 |
| 2,533,747 | 12/1950 | Thienemann | 350/239 |
| 2,635,504 | 4/1953 | Hawkins | 350/242 |
| 2,934,993 | 5/1960 | Chromy | 350/238 |

FOREIGN PATENT DOCUMENTS 964850 8/1950 France ............................ 350/236
665778 1/1952 United Kingdom .............. 350/243

Primary Examiner—William H. Punter
Attorney, Agent, or Firm—Roger A. Marrs

[57] ABSTRACT

A field microscope is disclosed herein for hand-held operation having a viewer body including a pair of bores lying on a parallel spaced-apart central axis for fixedly securing an eyepiece viewer with magnifying lens in a selected one of the bores and a slidable object mount in the other of the bores. The objective mount includes a guided track on its outwardly cantilevered end for frictional mounting of a detachable slide or panel intended to hold or carry the object to be viewed. The portion of the slide or panel retaining the object is movable with respect to the central optical axis of the lens and viewer by rotation of the objective mount or by linear movement thereof with respect to the body.

5 Claims, 1 Drawing Sheet

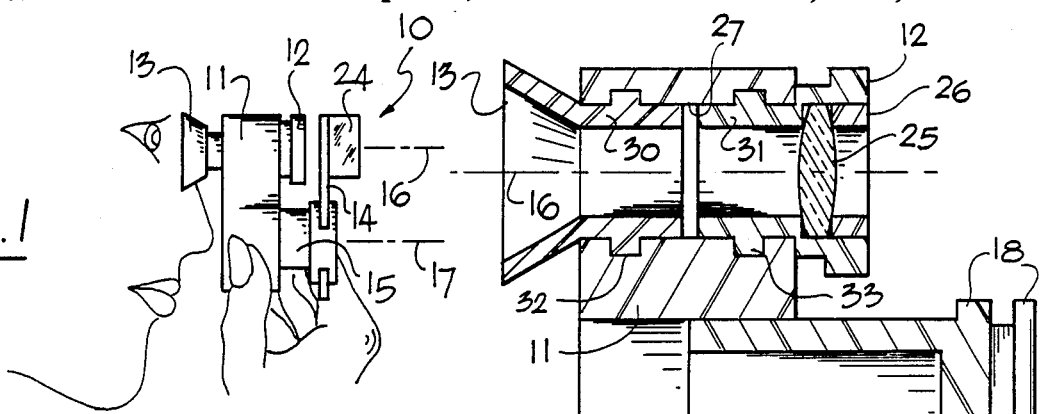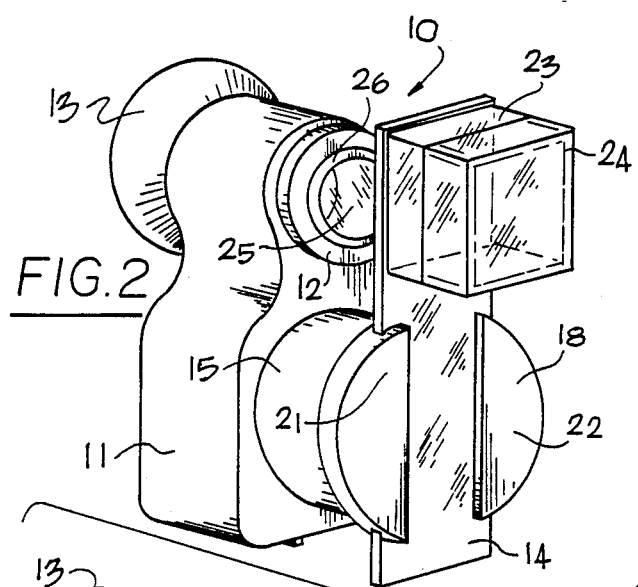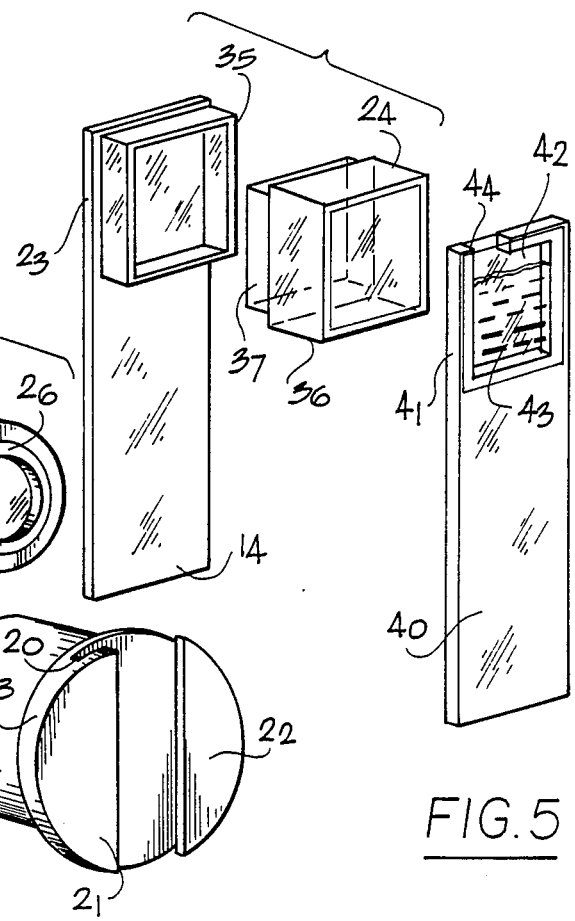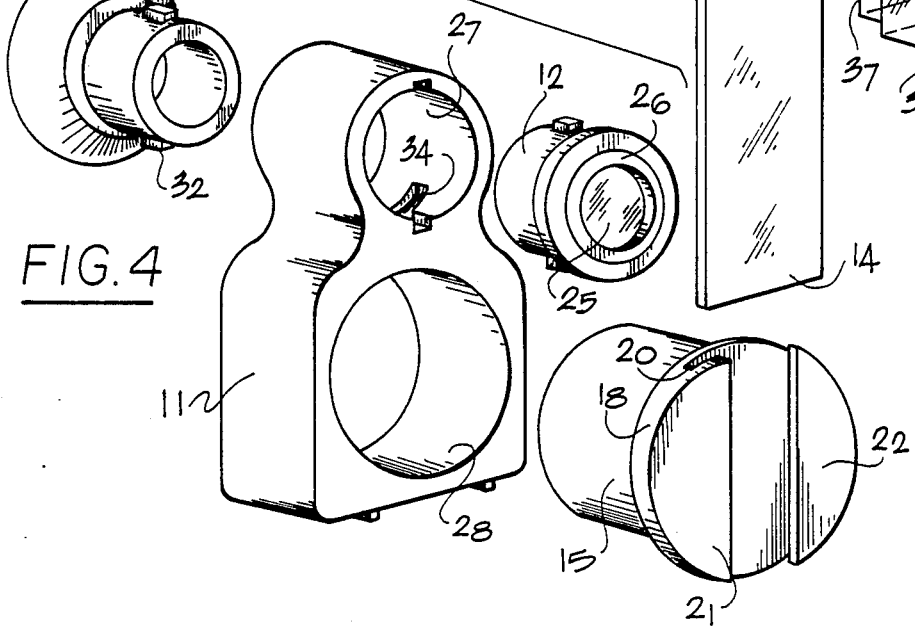

PORTABLE FIELD MICROSCOPE

BACKGROUND OF THE INVENTION

1. Field of the Invention

The present invention relates to portable compact microscopes for use in examining fixed or moving objects in a quick and efficient manner and, more particularly, to a microscope which is hand-held having means for supporting an object holder which is movable relative to a fixed magnifying lens.

2. Brief Description of the Prior Art

Conventionally, prior microscopes have included a magnifying device which is fixedly carried on a stand that supports a slide carrying or holding an objective to be observed. The stands are usually large and cumbersome which includes a mechanism for adjustably moving the magnifying means with respect to the fixed object on the slide. Also, no means are provided for holding or retaining a movable object on the slide so that it may be observed during the examining procedure through the use of the magnifying means. Even though such prior devices are noted as being portable, such expression usually refers to merely disassembling the apparatus so that it may be conveniently placed into a box or other carrying means so that it may be transported from one place to another. Such apparatus is not portable in the sense that the unit may be used in a hand-held fashion and may be moved from place to place by the user during the examining procedure. This latter, true portability is useful in positioning the apparatus outdoors or anywhere in field work where there is apt to be no flat or stable support surface on which a conventional microscope can be conveniently supported.

Another problem or difficulty encountered with conventional microscopes resides in the mounting of the object to be examined on a fixed base with the microscope means being moved relative thereto. It is difficult, if not impractical, to attempt to examine a moving object where the microscope means has to be moved relative thereto.

Also, most conventional microscopes used in field work are extremely expensive and costly in the manufacturing of component parts and require considerable assembly time and precision. Such prior apparatus is not useful for quick examination of objects in the field which are either of a fixed or moving nature and especially when the microscope apparatus is to be used by unskilled personnel, such as students or children.

Therefore, a long-standing need has existed to provide a novel, truly portable microscope apparatus which is economical to manufacture and convenient to use by unskilled persons that is adapted to be used in examining fixed or moving objects outdoors or anywhere in field work where no suitable flat or stable support is available.

SUMMARY OF THE INVENTION

Accordingly, the above problems and difficulties are obviated by the present invention which provides a novel field microscope intended to be hand-held incorporating a viewer body having a pair of bores aligned on parallel spaced-apart central axes. A magnifying lens including a viewer eye piece is fixedly secured to the body through one of the pair of bores while a movable and adjustable objective mount is carried in the other of the body bores. The objective mount includes a guide track on a selected end which is outwardly cantilevered from the viewer body for frictionally mounting a detachable slide or panel adapted to carry the object intended to be observed. Thereby, adjustment may be made of the object relative to the fixed optical axis of the microscope means or magnifying lens in a rotating manner as well as in a rectilinear manner.

Therefore, it is among the primary objects of the present invention to provide a novel portable microscope apparatus which is hand-held and may be used in field work for observing objects in a convenient manner without the necessity of a support surface on which to place the magnifying device.

Another object of the present invention is to provide a novel hand-held, portable microscope apparatus which includes a viewing means and an object holding means whereby the object may be moved relative to the viewing means while being held in the hands of the user.

Still another object of the present invention is to provide a novel portable field microscope relatively inexpensive to manufacture and which may be conveniently used by unskilled persons, such as students or children.

Yet another object of the present invention is to provide a novel microscope apparatus that may be used under field conditions for examining both fixed and movable objects which is unitary in construction in that the device includes a viewer and an object holder carried on an interconnecting body.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of the novel portable field microscope apparatus of the present invention illustrated in use during an object-examining procedure;

FIG. 2 is a perspective view of the novel microscope apparatus shown in FIG. 1;

FIG. 3 is a longitudinal cross-sectional view of the microscope apparatus shown in FIG. 2;

FIG. 4 is an exploded perspective view of the microscope apparatus; and

FIG. 5 is a perspective view of an alternate object holder usable with the microscope apparatus shown in FIGS. 1–4 inclusive.

DESCRIPTION OF THE PREFERRED EMBODIMENT

Referring to FIG. 1, the novel microscope viewer apparatus incorporating the present invention is shown in the general direction of arrow 10 which includes an elongated body 11 fixedly supporting a magnifying lens means 12 in optical alignment with a viewing eye piece 13. The viewer body 11 also movably supports an object holder taking the form of a slide or panel 14 which is carried on a mounting tube 15 slidably and rotatably carried on the body 11. As illustrated in FIG. 1, the viewer 10 is portable and, in particular, intended to be hand-held while the user is examining or observing the object. It is to be particularly noted that the viewing axis is indicated by numeral 16 while the rotating axis of the mounting tube 15 is indicated by numeral 17 which is parallel to an arranged and fixed space relationship to the axis 16.

Referring now in detail to FIG. 2, it can be seen that the object-supporting slide or panel 14 is frictionally held in a retainer 18 carried on the end of object adjusting tube 15 which takes the form of a slot 20, seen more clearly in FIG. 3, having shoulder portions 21 and 22 which overlap the edge marginal regions of the slide or panel 14 so that the slide or panel is retained in the slot. The slot is arranged on an axis or plane which is normal to the central axis 17 of the mounting tube 15. The slide or panel may be moved against its yieldable frictional engagement with the shoulders 21 and 22 so as to properly locate its object carrying end 23 relative to the viewing axis 16. It is to be particularly noted that the adjusting object tube 15 may be rotated about its central axis 17 as well as moved towards and away from the body 11. In this manner, the object carried on the end 23 of the slide or panel may be placed in proper viewing focus with respect to the viewer looking through the eye piece 13.

In the drawings of FIGS. 1 and 2, a feature of the invention resides in the provision of a cage or holder indicated by numeral 24 that is carried on the end 23 of the slide or panel 14. Holder 24 is intended to contain the object intending to be observed by the viewer. By constructing the holder 24 in the form of a transparent enclosure, a moving object such as an insect may be captured and confined in the holder so that when positioned by moving the slide member 14 in a vertical direction with respect to optical axis 16 and by rotating the adjusting object mount 15 about its axis 17, the moving object can be placed in alignment with the lens means 12. By moving the adjusting object tube 15 in and out with respect to the body 11, focusing is achieved after alignment has been attained. The lens means 12 includes a magnifying lens 25 held in place by a retaining ring 26.

Referring now in detail to FIG. 3, it can be seen that the body 11 is provided with a pair of spaced-apart but parallel bores indicated by numerals 27 and 28 respectively. Bore 27 is used to mount the magnifying means which comprises the eye piece 13 and the lens means which includes lens 25. Both the eye piece and magnifying means 12 include cylindrical sections 30 and 31 which fit into the bore 27 and connect thereto by means of a bayonet-type locking means taking the form of outwardly projecting keys 32 and 33 adapted to be inserted into a bayonet-type slot carried in the wall of the bore 27 in the body 11. Such a slot is indicated by numeral 34 in FIG. 4. Also, it is understood that other means may be provided for fixedly attaching the eye piece and lens means to the body 11.

The adjusting tube 15 is rotatably and slidably carried in a yieldable frictional relationship with the bore 28 so that the object supporting slide or panel may be positioned as desired to properly align the object carried on portion 23 of the slide along the optical axis 16 of the viewing means.

Referring now in detail to FIG. 4, an exploded view is shown wherein the simplicity of construction is emphasized in that only five major parts are used to form the basic construction. Preferably, the parts are composed of a lightweight plastic material which not only maintains economy but permits convenient assembly and usage by the viewer. The eye piece 13 and magnifying means 12 are fixedly installed in the bore 27 while the adjustable object tube or member 15 is movably inserted into the bore 28. The slide member 14 may be readily inserted into the slot 20 and held in yieldable frictional relationship by means of shoulders 21 and 22. It is to be noted that the object holder 24 may be fixedly carried on end 23 by means of a continuous siderail 35 over which a removable box-like structure 36 is disposed. The object studied, particularly if it is a live subject such as an insect, may be placed within the confines of the continuous sidewall 35 while the cage or holder portion 36 is detachably connected to the sidewall. This may be done by means of a rail arrangement 37 carried on the cage 36 which is placed in alignment and yieldable engagement with the sidewall 35. It is to be emphasized that the member 14 as well as the cage 24 are composed of transparent material and that the cage or holder 24 is intended to be placed on the optical axis 16 of the viewing means.

Referring now to FIG. 5, another embodiment of a slide or panel is illustrated and numeral 40 indicates the alternate slide or panel. The end 41 of the panel includes a cavity 42 for receiving a liquid 43 containing microscopic, molecular subject matter which may be living. The liquid is contained within the cavity by capillary action with respect to an opening 44 carried on end 41 in communication with the cavity 43. The liquid or fluid may be introduced into the cavity through the opening 44. Although the slide when placed into the viewer may be placed in different orientations, the liquid will not flow therefrom because of the capillary action.

In view of the foregoing, it can be seen that the hand-held viewer of the present invention is lightweight, economical to manufacture and convenient to use. Live or fixed objects may be observed and studied when the viewer holds the device to his eye. The object may be placed in focus by moving the tube 15 in and out of the body as well as rotating the same so that the object carried on the slide 14 or 40 may be aligned and focused. The object is moved with respect to the fixed lens 25 which is a major departure from conventional microscopes.

While the lenses of microscopes rely almost entirely upon magnification to simulate the results of close viewing of an object, the inventive "macroscope," places a single lens near the eye in such a way as to accomplish a close viewing without the use of multiple lenses and their inherent loss of clarity and illumination, while vastly increasing a field of view over that of conventional microscopes. Following moving organisms or positioning the specimen are done simultaneously with one hand. This in part is possible because the image is not reversed as is standard in a conventional microscope, and part due to the design feature listed herein.

Smoothness of all tracking and focusing moves make possible much better viewing. Conventional microscopes tend to be jerky. Fixation of object to the main body enables vibration-free viewing, unlike a conventional loupe. Three dimensional objects both living and dead are easily viewed without the need to be squeezed between two glass plates.

Lighting of the subject is accomplished by simply pointing at different backgrounds, or by changing the angle to the light source. This permits rapid comparison of the subject in: Brightfield, Darkfield, and Oblique illumination. These forms of lighting are executed with conventional microscopes only with appropriate accessories—but rapid comparisons are only possible if the conventional microscope is used by a highly trained microscopist. With the inventive scope, no special equipment or special training is necessary to observe this unique feature.

The device is easily and inexpensively adapted for use with a camera device through which pictures can be easily taken. Simply remove and replace eyepiece 13 in FIG. 1 to accept a camera adapter for picture purposes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A portable viewer for hand-held field use comprising the combination of:

a body;

magnifying means fixedly carried on said body and having a central optical axis;

an object member holding an object intended to be observed;

adjustable mounting means movably supporting said member along said optical axis;

said adjustable mounting means includes a central axis parallel to said optical axis in fixed spaced-apart relationship;

said adjustable mounting means adapted to move rectilinearly along said central axis and to rotate about said central axis for moving said object in and out of focus along said optical axis as well as for alignment of said object with said optical axis;

said adjustable mounting means includes a slot normal to said central axis for slidably supporting said object member in yieldable frictional engagement therewith;

said object member is an elongated panel having one end slidably engaged with said adjustable mounting means slot and its opposite end outwardly extended therefrom to support said object to be observed along said optical axis;

said body includes contoured opposite sides separated by said magnifying means and said adjustable mounting means for finger grasping by the user to align said optical axis with the eye of the user;

said magnifying means includes an eyepiece and a lens coaxially lying on said optical axis;

said body includes a pair of bores having parallel spaced-apart axis; and said magnifying means fixedly disposed in one bore of said pair and said adjustable mounting means moveably disposed in the other bore of said pair.

2. The invention as defined in claim 1 wherein:

said adjustable mounting means is a cylindrical member having said mounting slot in one end and its opposite end frictionally carried said other bore of said pair for simultaneous rotary and linear movement.

3. The invention as defined in claim 2 wherein:

said object member includes a box-like holder composed of a transparent construction for holding objects for three-dimensional viewing.

4. The invention as defined in claim 2 wherein:

said object member includes a cavity provided in said object holding end of said object member enclosing a quantity of liquid to be viewed; and an opening in said object member in communication with said cavity for introduction of said liquid to said cavity.

5. The invention as defined in claim 4 wherein:

said eyepiece and lens holder are fixed to said body by a bayonet connection in cooperation with slots in said one bore of said pair of bores.

* * * * *